US009947028B1

(12) United States Patent
Podgorny et al.

(10) Patent No.: US 9,947,028 B1
(45) Date of Patent: Apr. 17, 2018

(54) SYSTEM AND METHOD FOR INCREASING ONLINE CONVERSION RATE OF POTENTIAL USERS

(71) Applicant: Intuit Inc., Mountain View, CA (US)

(72) Inventors: Igor A. Podgorny, San Diego, CA (US); Warren E. Bartolome, San Diego, CA (US); Todd Goodyear, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 757 days.

(21) Appl. No.: 14/192,185

(22) Filed: Feb. 27, 2014

(51) Int. Cl.
*G06Q 30/02* (2012.01)

(52) U.S. Cl.
CPC ............................... *G06Q 30/0269* (2013.01)

(58) Field of Classification Search
None
See application file for complete search history.

(56) References Cited

U.S. PATENT DOCUMENTS

| 8,165,997 | B1 | 4/2012 | Podgorny et al. | |
|---|---|---|---|---|
| 2007/0156621 | A1* | 7/2007 | Wright | G06O 30/02 706/48 |
| 2009/0119161 | A1* | 5/2009 | Woda | G06Q 10/00 705/7.29 |
| 2011/0106721 | A1* | 5/2011 | Nickerson | G06Q 30/02 705/347 |
| 2014/0188781 | A1* | 7/2014 | Fawaz | G06N 5/043 706/59 |
| 2014/0222503 | A1* | 8/2014 | Vijayaraghavan | G06Q 30/0201 705/7.29 |
| 2014/0249872 | A1* | 9/2014 | Stephan | G06Q 10/063 705/7.11 |
| 2014/0351046 | A1* | 11/2014 | Carlyle | G06O 30/0255 705/14.53 |
| 2014/0358612 | A1* | 12/2014 | Sri | G06Q 30/016 705/7.15 |

FOREIGN PATENT DOCUMENTS

WO    WO-2011163251 A2 * 12/2011    ......... G06Q 30/0201

OTHER PUBLICATIONS

"RealITimes_Blog_04_6_2012"—"Video Conferencing is Accounting for your last-minute tax preparation", published online at www.real.com/resources/tax-preparation-via-video-conference/ on Apr. 6, 2012 on the "RealTimes" blog.*

(Continued)

*Primary Examiner* — James M Detweiler
(74) *Attorney, Agent, or Firm* — Vista IP Law Group LLP

(57) ABSTRACT

A computer-implemented method of increasing the online conversion rate of potential users to a computer-hosted service is described. The method includes a computing device receiving a browser request from a potential user, the computing device receiving user-specific data as part of the browser request. The computing device inputs the user-specific data into a conversion model executed by the computing device and outputs a conversion score for the potential user based on the model. The computing device sends to the browser a marketing intervention if the conversion score falls below a pre-determined threshold value.

25 Claims, 9 Drawing Sheets

(56) References Cited

OTHER PUBLICATIONS

"Predicting Purchasing Behavior Throughout the Clickstream"—Nov. 2012 (Year: 2012).*
Wikipage Logistic Regression, http://en.wikipedia.org/wiki/Logistic_regression, printed Apr. 15, 2014 (18 pages).
H&R Block webpage, http://www.hrblock.com/get-answers/tax-questions-answers.html, printed Apr. 15, 2014 (6 pages).
AnswerXchange Webpage, https://ttlc.intuit.com/tags/health%20exchange, printed Apr. 15, 2014 (9 pages).
Wikipage Random Forest, http://en.wikipedia.org/wiki/Random_forest, printed Apr. 15, 2014 (6 pages).

* cited by examiner

SYSTEM AND METHOD FOR INCREASING ONLINE CONVERSION RATE OF POTENTIAL USERS

SUMMARY

In one embodiment, a computer-implemented method of increasing the online conversion rate of potential users to a computer-hosted service includes a computing device receiving a browser request from a potential user, the computing device receiving user-specific data as part of the browser request. The computing device inputs the user-specific data into a conversion model executed by the computing device. The computing device then outputs a conversion score for the potential user based on the model. The computing device sends to the browser a marketing intervention if the conversion score falls below a pre-determined threshold value.

In another embodiment, a system for increasing the online conversion rate of potential users to a computer-hosted service includes a computing device configured to receive a browser request from a potential user, the computing device receiving user-specific data as part of the browser request. The system includes a conversion model executed by the computing device, the computing device inputting the user-specific data into the conversion model to produce a conversion score for the potential user based on the model. The computing device is configured to send to the browser a marketing intervention if the conversion score falls below a pre-determined threshold value.

In another embodiment, a computer-implemented method of increasing the online conversion rate of potential users to a computer-hosted service includes a computing device retrieving user-specific data when the computing device communicates with the computer-hosted service. The computing device inputs the user-specific data into a conversion model executed by the computing device. The computing device outputs a conversion score for the potential user based on the model. The computing device presents to the user a marketing intervention if the conversion score falls below a pre-determined threshold value.

BRIEF DESCRIPTION OF THE DRAWINGS

FIG. 6 illustrates a threshold being established for a marketing intervention at 20%.

DETAILED DESCRIPTION OF ILLUSTRATED EMBODIMENTS

The methods and systems described herein are suitable for increasing the online conversion rate of potential users to a computer-hosted service. In the context of this Application, online conversion rate is meant to indicate the rate at which visitors of a website are converted into authenticated users. An authenticated user is a user that satisfies a pre-determined threshold activity. In one example, the pre-determined threshold activity may include establishing a new account (e.g., establishing a user name and password). In other instances, an authenticated user may require additional activity on the part of the user. For example, an authenticated user may include establishing a new account as well as submitting a payment or providing a means of payment (i.e., adding a credit card or debit card number to be used for payment).

A visitor to a website may arrive in any number of ways. The user, for example, may type the exact URL into his or her browser which then directs the user's browser to the website. Alternatively, the user may arrive at the website by clicking on a hyperlink appears on another webpage, such as a search results page that is generated in response to a search performed in a search engine. The user may also arrive at the website through a paid advertisement, whether a promoted link or other add that is displayed to the user.

The system and method described may be used to increase the conversion rate of potential users to a computer-hosted service. The type of computer-hosted service may vary. In one specific example, the computer-hosted service is a tax preparation service. For example, the website may be used by a user to prepare and file his or her tax return with various taxing jurisdictions (e.g., TurboTax Online available from Intuit, Inc). In another specific example, the computer-hosted service may be a question and answer service. For example, question and answer service may be used to post questions and answers regarding tax-related issues (e.g., TurboTax AnswerXchange available from Intuit, Inc.). The system and method described herein may also be used with other e-commerce services besides those specifically linked to tax preparation and filing although such applications are preferred in some embodiments.

Figure 1:
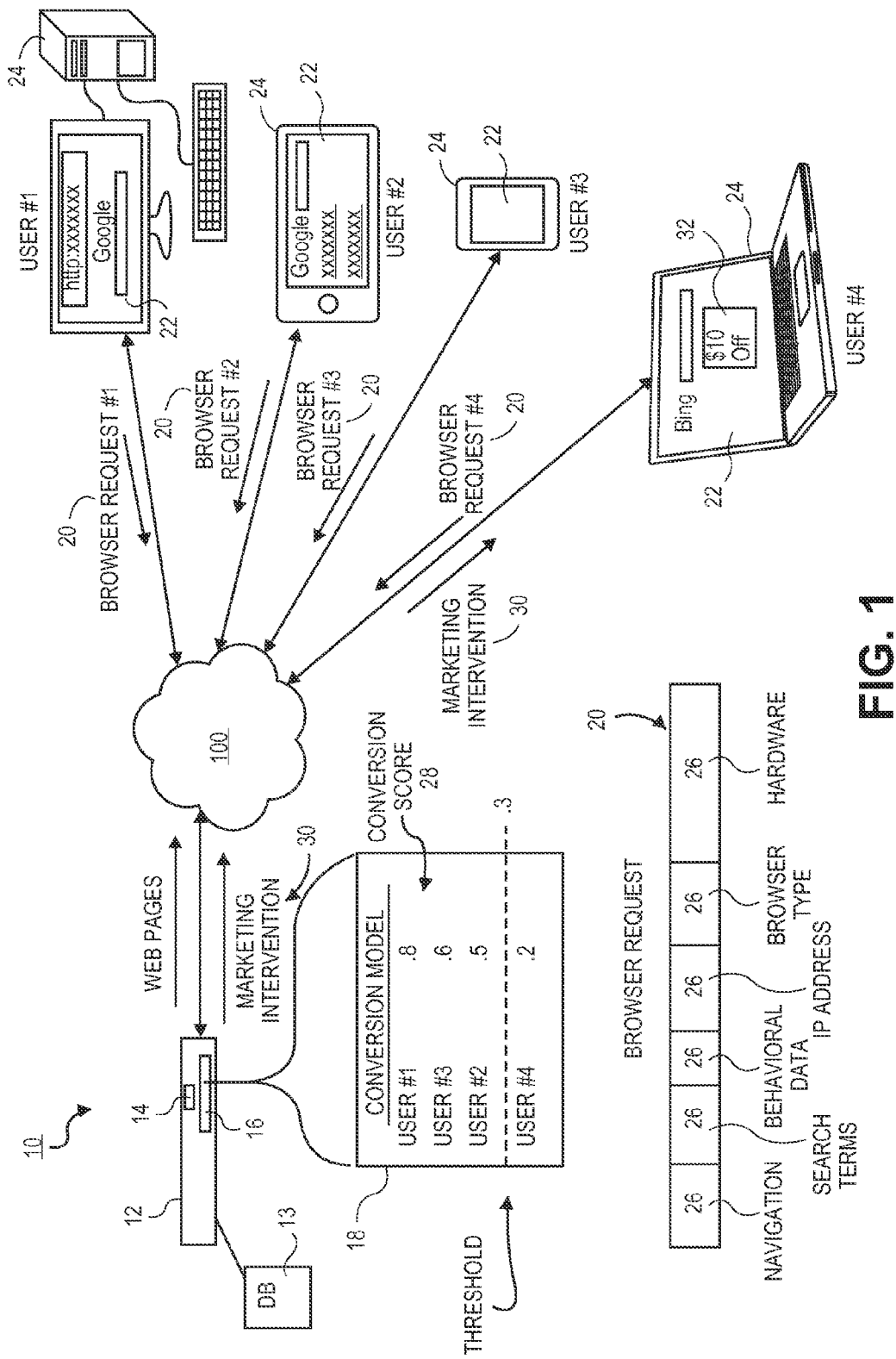
FIG. 1 illustrates a system for increasing the online conversion rate of potential users according to one embodiment.

FIG. 1 illustrates a system 10 that is used to increase the online conversion rate of potential users. The system includes a computing device 12 such as a server computer that is configured to receive a browser request from a potential user. The computing device 12 may include a single server or multiple servers working together. Each computing device 12 includes one or more processors 14 therein that are used to execute software 16 for the computer-hosted service. For example, in the context of a tax preparation service, software 16 is executed on the computing device 12 to calculate taxes due. As explained herein in more detail, the software 16 contains or is otherwise operably linked to a conversion model 18 that is designed to take user-specific data (obtained from browser data or data stored on a user computing device) and process the same to output a conversion score for the potential user. The computing device 24 may be operatively connected to one or more databases 13 which can be used to store, in some embodiments, user IDs, and user-specific information 26.

Still referring to FIG. 1, the computing device 12 receives a browser request 20 from a potential user of the computer-hosted service. In this specific example, there are four potential users (user#1, user#2, user#3, user#4) for purposes of illustration but it should be understood that there are many more potential users. The browser request 20 is initiated by a browser application 22 contained on a computing device 24 of the potential user. The browser application 22 may include any number of browser applications 22 that are used to navigate the Internet. Examples include Internet Explorer, Chrome, Firefox, Safari, Opera, and the like. The browser application 22 may run on a number of different computing devices 24 including personal computers, laptops, tablets, smartphones, personal digital assistants, and the like.

In one aspect, a browser request 20 is initiated after a user has clicked on a link that has been generated in response to a search made using a search engine. For example, a potential user of the computer-hosted service may search "online taxes." Such a search may be made through any one of a number of search engines (e.g., Google, Yahoo, Bing, Ask, and the like). The search made through a search engine typically present a number of links to the user that he or she can then select. For example, in response to such a search, a link (e.g., https://turbotax.intuit.com/) may be presented to a potential user. The potential user may then click on the link (as seen on the display of computing device 24 for user#2 in FIG. 1) which then initiates a browser request 20 to the computing device 12. The computing device 24 running the browser application 22 is connected to a network 100 such that data can be passed between the browser application 22 and the computing device 12. The network 100 may include a wide area network such as the Internet. The browser request 20 that is received at the computer device 12 contains user-specific data 26. User-specific data 26 can include browser navigation data which includes a history of recently visited web pages. User-specific data 26 may also include browser search terms (e.g., "online taxes" in the above noted example). User-specific data 26 may also include user behavioral data. For example, if a user lands on homepage of a computer-hosted service (e.g., TurboTax Online), the user's history of page clicks on that particular website may be tracked and stored. For example, if a potential user is trashing between pages in a relatively rapid manner, this may indicate that he or she is frustrated. User-specific data 26 may also include a tracking of the link or links the user traveled over to reach the website. Such behavior can be quantified and tracked. The user-specific data 26 may also include the IP address of the computing device 24 used to initiate the browser request 20. The IP address may be used to roughly gauge the geographic location of the potential user. The user-specific data 26 may also include the type of browser used, the operating system of the computing device 24, and hardware used as part of the computing device 24. User-specific data 26 may also include other types of information such as the type of search that landed a particular user onto a particular page. The search may include an organic search in which a user clicked a non-promoted link that was generated by a search engine. The search may include a promoted or paid search that was generated by a search engine. Various other types of online advertisement channels can be tracked to identify how the particular user ended up on the webpage. Other examples of user-specific data include the identity or name of the first web page visited by the user. Another example includes the marketing channels through which the user arrived at the site.

Still referring to FIG. 1, the computing device 24 includes a conversion model 18 that is used to generate a conversion score 28 of the potential users that takes all or portions of the user-specific information 26 from the browser request 20. The conversion score 28, in one embodiment of the invention, is numerical and represents or is indicative of the probability that a potential user will become an authenticated user. The conversion score 28 may be expressed as an integer, fraction, percentage or the like. In the particular example of FIG. 1, the conversion score is listed for user#1, user#2, user#3, and user#4. In this particular example, a ranking of 1.0 would indicate a 100% probability of converting a potential user to an authenticated user. Conversely, a ranking of 0.0 would indicate a 0% probability of converting a potential user to an authenticated user. As seen in FIG. 1, the conversion module 18 has ranked the potential users (user#1, user#2, user#3, and user#4) based on a descending conversion score 28.

In this particular example, the software 16 and/or the conversion model 18 are set to identify those potential users with a conversion score 28 that falls below a pre-established threshold of 0.3. For all the potential users with a conversion score 28 that falls below this 0.3 threshold, the software 16 and/or the conversion model 18 are configured to send a marketing intervention 30. In this particular example, user#4 is the only user with a conversion score 28 that is below the 0.3 threshold. Thus, only user#4 receives the marketing intervention 30.

Figure 2:
FIG. 2 illustrates a screen shot of a website of a computer-hosted service in which a marketing intervention has taken place.
Figure 3:
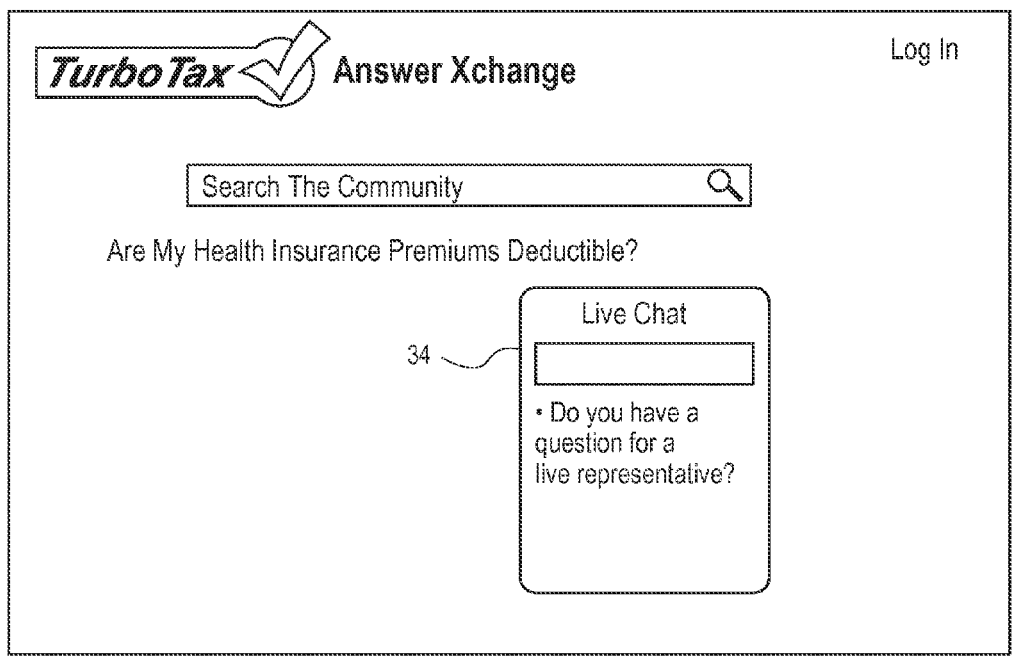
FIG. 3 illustrates a screen shot of a website of a computer-hosted service in which a marketing intervention has taken place.

The marketing intervention 30 that is received by user#4 may take a number of different forms. An example of a marketing intervention 30 is that a potential user is presented with a discount offer 32 or coupon. The discount offer 32 or coupon may be presented to the potential user as a popup window or the like. Alternatively, the discount or coupon may be integrated into a web page that is delivered to the potential user. FIG. 2 illustrates an exemplary webpage 110 that is presented to a potential user that includes a discount offer 32. The discount offer 32 can be integrated into the webpage 110 or as part of another window (e.g., popup). Another example of a marketing intervention 30 is that a chat dialog box 34 is presented to the potential user as illustrated in FIG. 3. The computer 12 is instructed by the software 16 and/or conversion model 18 to open a chat dialog box 34 in the browser application 22. The chat dialog box 34 permits real-time communication with a live operator or, in some other instances, a super-user that can answer any questions that the potential user may have.

In another aspect, the marketing intervention 30 may include priority queue status. For example, a chat dialog box 34 may open for the user but there is a wait time until a live operator or super-user is available. In one aspect, the marketing intervention may allow the potential user to "jump ahead" in the normal queue. This priority queue status may be invisible to the user or, alternatively, the user may be notified that he or she has been granted priority quest status.

The establishment of a particular threshold value of the conversion score 28 for the triggering of marketing intervention 30 is determined by business factors any may be altered or changed as needed. For example, a business may decide to only present marketing interventions 30 to potential users with a conversion score 28 that is below 0.5 as one example. Here, customers with a ranking above this level are more likely than not to become authenticated users. Because these potential users are likely to become authenticated, there is no need to present them with marketing interventions 30. However, potential users with conversion scores 28 that fall below the threshold level of 0.5 are more likely than not to not authenticate (e.g., open an account). Therefore, marketing efforts are focused to this sub-group of potential users. Thus, this sub-group of potential users (with conversion scores 28 that fall below the threshold level of 0.5) are presented with a marketing intervention 30.

The threshold level of the conversion score 28 may be altered by the computer-hosted service. Moreover, potential users falling below this threshold level maybe further analyzed by the conversion model 18 whereby different potential users within this sub-group are given different marketing interventions 30. For example, a potential user that falls just below the threshold value may be converted to an authenticated user by presenting him or her with a chat dialog box. Another potential user with a much lower conversion score may need to be delivered a discount offer 32.

In one aspect, the conversion model 18 that is used is developed on a known dataset of prior users that have visited the computer-hosted service in the past. For example, it is known whether a particular user that has visited the site in the past has authenticated. Moreover, the user-specific data 26 from both the non-authenticating and authenticating users are known. Taking the user-specific data 26 for both authenticated and non-authenticated users can then be used to generate the conversion model 18 that is used to predict what potential customers will ultimately become authenticated.

For example, a training data set of past users that visited TurboTax.com for the first time from search engine can be obtained. Each visitor within this dataset can then be classified as to whether or not the user was authenticated. User-specific data 26 associated with each user within the set is also obtained and can be stored, for example, in a database. Machine learning on this training data set is then used to generate the conversion model 18. Examples of types of machine learning that can be used to generated the conversion model 18 includes Logistic Regression, Neural Networks, Random Forest or Gradient Boosted Decision Trees to determine the maximum precision achievable and to select the optimal selection and weightings of user-specific data 26.

In one aspect, the conversion model 18 is a static model in that once the training dataset has been subject to machine or ensemble learning the conversion model 18 remains largely unchanged. In another embodiment, however, the conversion model 18 may be a dynamic model in that the conversion model 18 is updated on a regular or periodic basis as information on new users is obtained. In this regard, the dynamic model implementation may be tuned or otherwise changed as additional users visit one of the TurboTax landing pages. The dynamic model may be changed, for example, as user demographics and user behavior changes during the tax preparation season.

Figure 4:
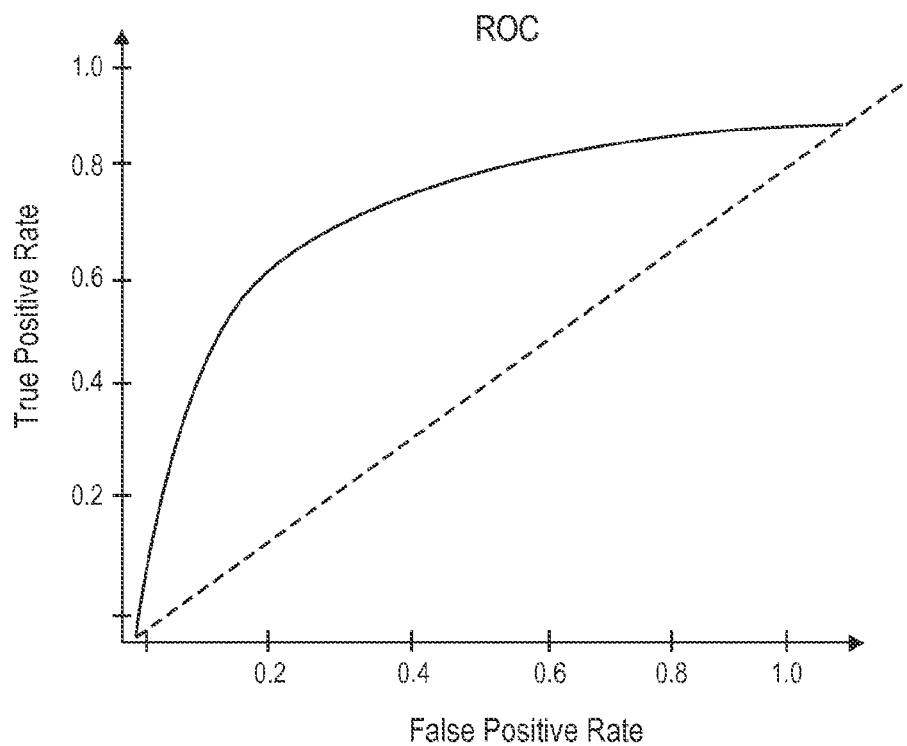
FIG. 4 illustrates a receiver operating characteristic (ROC) curve which illustrates the performance of a binary classifier system. The ROC curve plots the true positive rate as a function of the false positive rate.
Figure 5:
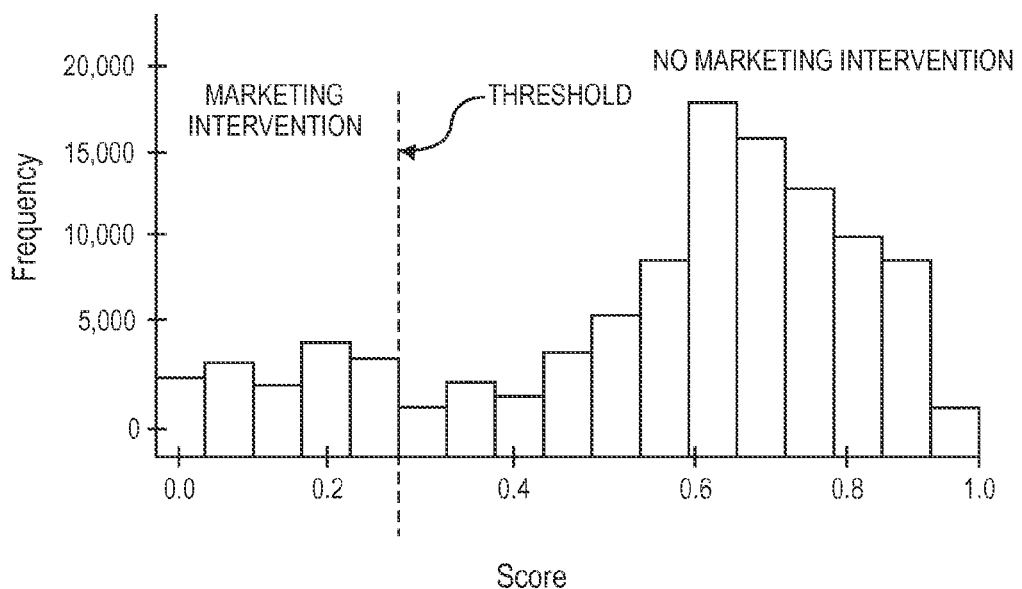
FIG. 5 is a histogram illustrating the frequency of conversion scores in a population of users.

FIG. 4 illustrates the performance of a conversion model 18 that has been established on a training data set. The graph is a receiver operating characteristic (ROC) curve which illustrates the performance of a binary classifier system. The ROC curve plots the true positive rate as a function of the false positive rate. The dashed line in FIG. 4 illustrates random sampling. As seen by the ROC curve, the upwardly sloping bias toward the true positive rate indicates good performance of the conversion model 18 in accurately predicting whether a potential user becomes an authenticated user. FIG. 5 illustrates a frequency histogram of the distribution of conversion scores generated by the conversion model 18. Also illustrated in FIG. 5 is an illustrative pre-determined threshold (at around 0.25) that determines whether or not a particular potential user is served a marketing intervention 30. Those potential users with conversion scores below 0.25 are given a marketing intervention 30 while those potential users with conversion scores at or above 0.25 are not given any marketing intervention 30.

Figure 6:
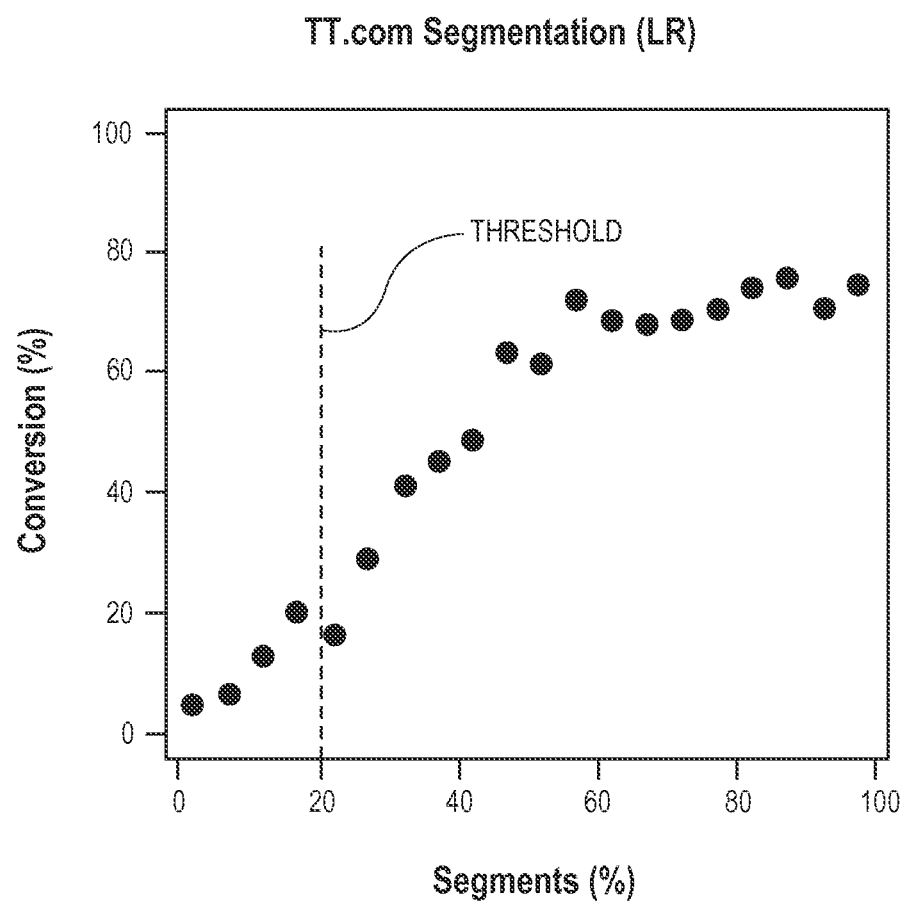
FIG. 6 illustrates segmentation graph illustrating conversion percentage as a function of segment % for a universe of users.

FIG. 6 illustrates a segmentation graph of users scored with the a logistic regression model. The segmentation graph divides an entire universe of users into score segments (e.g., twenty segments) and for each segment of users establishes a conversion rate. The segmentation graph can be one way to visually see the distribution of users as a function of conversion rate in the selected segments. Such a graph can be used to segment a slice of users that can be targeted for a marketing intervention 30 (e.g., bottom 20% of users).

The software 16 and/or conversion model 18 may be run on a number of platforms. For example, Ruby on Rails may be used to program and implement the conversion model 18. The conversion model 18 may also be implemented as a SQL script. While FIG. 1 illustrates that the conversion model 18 is run on the server side (i.e., at computer 12), in other embodiments the conversion model 18 may be run on the client side at the various computing devices 24. For example, the conversion model 18 may be scripted and implemented using JavaScript.

In one preferred embodiment, a potential user of the computer-hosted service will be scored within a few seconds (e.g., less than five) after visiting a website. During this time period, the user-specific data 26 is run through the conversion model 18 and a conversion score 28 is generated. Moreover, if the conversion score 28 falls below the pre-determined threshold, the marketing intervention 30 is delivered to the user within this same time period (e.g., less than five seconds). An important aspect of the system and method described herein is that a rapid determination can be made in near real-time on whether or not a marketing intervention 30 is needed for any particular user. Attrition rates increase tremendously as a function of time spent on a website. In one aspect, the conversion score 28 is generated and a determination is made on whether or not to deliver a marketing intervention 30 is made within a fraction of a second.

The system and method described herein is particularly applicable for first time visitors to a particular online property that offers computer-hosted services. That is to say, the system and method according to one preferred embodiment is directed to first time visitors to a site. In this regard, a potential user that visits a site may be assigned an ID or key that corresponds to, for example, their internet protocol (IP) address. This assigned ID or key may be stored in a database 13 or the like that is accessible by the software 16 on computer 12. During their first visit to the website, a conversion score 28 may be generated for the user and possible marketing intervention 30 may be presented to the user depending on the pre-determined threshold. On the second visit to the site by this same user, the software 16 and or conversion model 18 will identify that this user has already visited the site and will not again score the user using the conversion model 18. The ID or key, however, may be associated with an expiration date or time limit (e.g., six months) that, when reached, will be deleted or otherwise ignored. A return user visiting after this expiration date or time limit would then be recognized as a first time visitor and scored as described herein.

Figure 7:
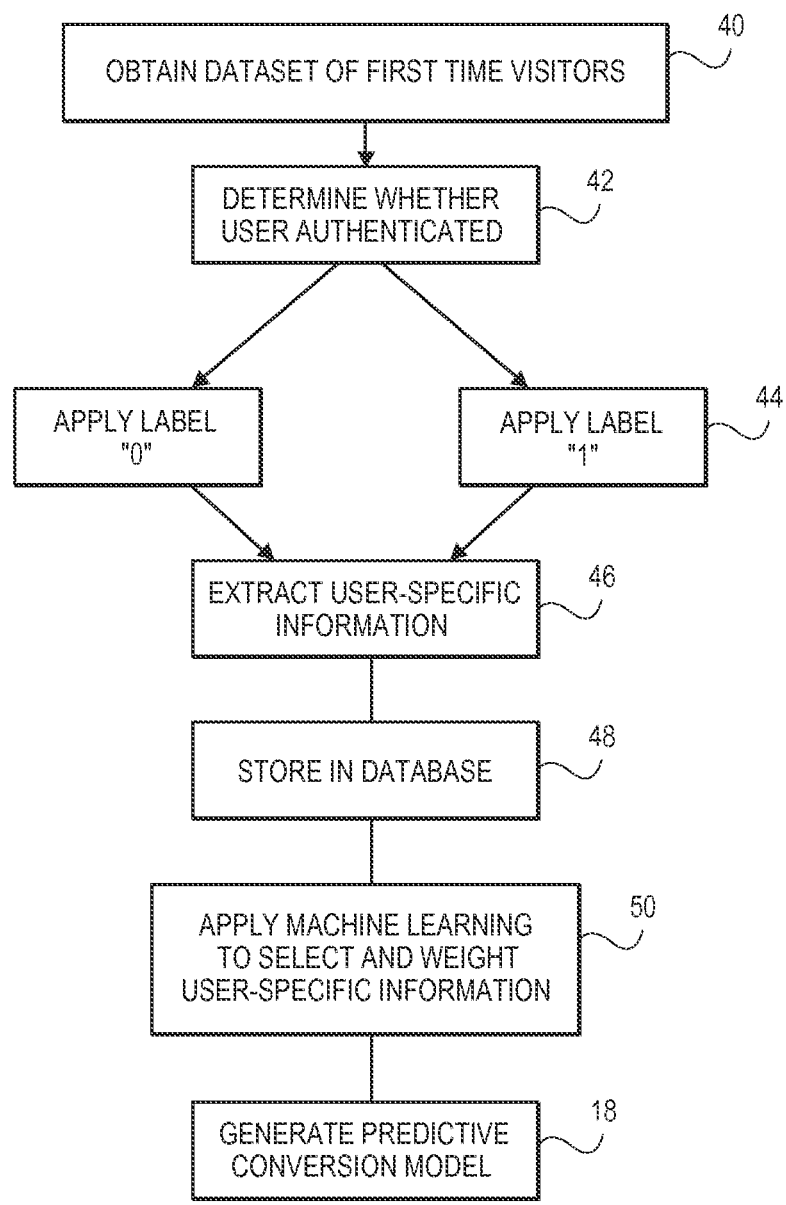
FIG. 7 illustrates a method of generating a model according to one embodiment.

FIG. 7 illustrates a method of generating the conversion model 18 according to one embodiment. As seen in operation 40 a known dataset of first time visitors to a website is obtained. The dataset preferably has a large number of users such that an accurate conversion model 18 can be created therefrom. For each visitor, as seen in operation 42 it is determined whether the particular visitor authenticated on the website or not and is assigned a label (e.g., 1 or 0) as seen in operation 44. For each user, user-specific information 26 is then extracted as seen in operation 46 from the browser session that took place between the user and the website. The user identification, label, and user-specific information 26 can be stored in a database as illustrated in operation 48. Next, as seen in operation 50, machine learning is applied to the data contained in the database to select and weight the user-specific information into a predictive conversion model 18 that is then able to output a conversion score 28 for new users.

The conversion model 18 that may be used may include a logistic regression model. Alternatively, the conversion model 18 may include a Random Forest model. The Random Forest model may be more accurate when the number of attributes (explained below) is large. The Random Forest model is computationally more complex, however, and in many applications a logistic regression model will work with more than sufficient accuracy. For example, a logistic regression model is easier to implement and test in a production environment, for example, with JavaScript or SQL.

A description will now be given of the operation of a logistic regression model that can be used. In this model, user-specific information 26 in the form of attributes is collected from a user's browser (e.g., from a browser request 20). The attributes are rapidly captured once a user lands on a particular webpage. Examples of attributes include the length of a query made in a search engine (e.g., text or character length), the nature of the words used in the query, whether the query is empty (because of a user setting in the browser), the name or identity of the first page on which the user lands. In this particular model the attribute is assigned a value which in some instances is a binary value of either 0 or 1 depending on whether or not the particular attribute is satisfied by the user.

Table 1 listed below provides, for example, a listing of attributes that are utilized as part of a linear regression model to predict whether or not a user will become an authenticated user. Another way of saying this is identifying those potential users where a marketing intervention 30 should be presented to a particular user landing on a website property because of a low likelihood of that user actually becoming an authenticated user. Each listed attribute is listed in descending order according to the Information Gain value. The term "Information Gain" is meant to indicate relative importance of that attribute as it relates to the other attributes. For example, in the embodiment utilizing the attributes of Table 1, the query length is the most important indicator about whether a potential user will require a marketing intervention 30.

TABLE 1

| Attribute name | Coefficient | Information Gain | Explanation | Binary (B) or Integer (I) |
|---|---|---|---|---|
| query.attribute.length | −0.0020907 | 0.0764847407 | Length of search engine query | I |
| query.category.turbo | 0.0515372 | 0.0745983851 | Search engine query using "turbo" | B (0 or 1) |
| channel.three | −0.5180936 | 0.0540439812 | Marketing channel #3 | B (0 or 1) |
| query.category.turbotax | 0.0877941 | 0.0456083224 | Search engine query using "turbotax" with other search terms | B (0 or 1) |
| channel.one | −0.1751325 | 0.0381651010 | Marketing channel #1 | B (0 or 1) |
| query.turbotax | 0.0419993 | 0.0373983875 | Search engine query using "turbotax" | B (0 or 1) |
| name.first.page.one | 0.3841923 | 0.0314027895 | Name of first landing page for user (page #1) | B (0 or 1) |
| channel.four | −0.3262514 | 0.0183111681 | Marketing channel #4 | B (0 or 1) |
| query.category.calculator | −0.1108123 | 0.0159614494 | Search engine query using "calculator" | B (0 or 1) |
| name.first.page.four | −0.0911406 | 0.0134944091 | Name of first landing page for user (page #4) | B (0 or 1) |
| query.turbo.tax | 0.1163493 | 0.0100281218 | Search engine query using "turbo.tax" | B (0 or 1) |
| channel.two | −0.4287712 | 0.0097156239 | Marketing channel #2 | B (0 or 1) |
| name.first.page.three | 0.0133534 | 0.0071398254 | Name of first landing page for user (page #3) | B (0 or 1) |
| query.category.irs | −0.0458282 | 0.0068234269 | Search engine query using "IRS" | B (0 or 1) |
| name.first.page.six | 0.1108991 | 0.0063166520 | Name of first landing page for user (page #6) | B (0 or 1) |
| name.first.page.five | 0.0544203 | 0.0043480510 | Name of first landing page for user (page #5) | B (0 or 1) |
| query.empty | −0.0494736 | 0.0027608145 | Empty search engine query | B (0 or 1) |
| name.first.page.eight | 0.0000176 | 0.0024660561 | Name of first landing page for user (page #8) | B (0 or 1) |
| channel.five | −0.3501175 | 0.0023884737 | Marketing channel #2 | B (0 or 1) |
| name.first.page.ten | 0.0926005 | 0.0018352368 | Name of first landing page for user (page #10) | B (0 or 1) |
| name.first.page.two | −0.0549087 | 0.0009185947 | Name of first landing page for user (page #2) | B (0 or 1) |

During operation of the logistic regression model, each visitor to the website is given a unique visitor ID. In one aspect of the invention, this unique visitor ID is stored such that the marketing interventions 30 as contemplated herein are only applied to first time users (i.e., those users that are landing on the site for the first time). Of course, in other embodiments, return users could be run through the model as well, for example, return users that have returned to the website after a period of time has elapsed (e.g., user has not returned in last six months).

Next, the conversion model 18 computes a conversion score for the user based on the multiplying the applicable attribute values by the model coefficients of Table 1. In many attributes, the value of the attribute is binary in that it is either assigned a value of "1" or "0." In other attributes, for example, the query.attribute.length attribute, the value is an integer that corresponds to the length of the text used in the search engine query. Once the values have been assigned and multiplied by their respective model coefficients, the computed values are then summed and added to an intercept value. The intercept value for the model, which is a constant, is added the computed values to produce the conversion score. Generally, the conversion score should fall between values of "0" and "1" with scores of "1" being those users with a 100% probability of becoming authenticated users and scores of "0" being those users with a 0% probability of becoming authenticated users. It should be understood, however, that in some instances the conversion score could extend somewhat beyond these end points and would need to be normalized to fall within this range. Further, the exact endpoints do not matter as it is the relative ranking that is provided by the conversion score that matters.

Example 1

In this example, a conversion model 18 that is based on a logistic regression model is used to generate a conversion score for a user that inputs the text "turbotax" into a search engine. In this example, the following SQL query is used:

```
select visitor_id, auth_id,
length(post_keywords) query_attribute_length,
case when post_keywords like '% turbo %' then 1 else 0 end query_category_turbo,
case when post_keywords like '% turbotax %' then 1 else 0 end query_category_turbotax,
case when post_keywords like '% estimator %' or post_keywords like '% calculator %' then 1 else 0 end query_category_calculator,
case when post_keywords like '% irs %' then 1 else 0 end query_category_irs,
case when post_keywords='turbotax' then 1 else 0 end query_turbotax,
case when post_keywords='turbo tax' then 1 else 0 end query_turbo_tax,
case when post_keywords='::empty::' then 1 else 0 end query_empty,
case when channel='Campaign: Paid Search Brand' then 1 else 0 end channel_one,
case when channel='Organic Brand' then 1 else 0 end channel_two,
case when channel='Organic Generic' then 1 else 0 end channel_three,
case when channel='Campaign: Paid Search Generic' then 1 else 0 end channel_four,
case when channel='Organic Google Unknown' then 1 else 0 end channel_five,
case when name_first_page='/index.jsp TT.com' then 1 else 0 end name_first_page_one,
case when name_first_page='/lp/ty12/ppc/blkbrd-dlx-nay.jsp TT.com' then 1 else 0 end name_first_page_two,
case when name_first_page='/lp/ty12/ppc/tmp4_5p.jsp TT.com' then 1 else 0 end name_first_page_three,
case when name_first_page='/lp/ty12/ppc/tmp2_4p.jsp TT.com' then 1 else 0 end name_first_page_four,
case when name_first_page='/lp/ty12/ppc/tmp1_5p.jsp TT.com' then 1 else 0 end name_first_page_five,
case when name_first_page='/lp/ty12/ppc/mya.jsp TT.com' then 1 else 0 end name_first_page_six,
case when name_first_page='FedAccepted' then 1 else 0 end name_first_page_seven,
case when name_first_page='/lp/ty12/ppc/trusted-free-tax.jsp TT.com' then 1 else 0 end name_first_page_eight,
case when name_first_page='TransRecv' then 1 else 0 end name_first_page_nine,
case when name_first_page='/lp/ty12/ppc/tmp5_5p.jsp TT.com' then 1 else 0 end name_first_page_ten,
case when auth_id<0 then 0 else 1 end conversion
```

In this particular example, in Example 1 a visitor ID is established (e.g., visitor_id=12352928139). Applying the SQL search query from above produces the following attributes:

query_attribute_length=8
query_category_turbo=1
query_category_turbotax=1
query_turbotax=1
channel_two=1
channel_three=0
name_first_page_one=1
(remaining attributes are zero)

Using these attributes, a conversion score is calculated as follows:

Conversion Score #1=0.6651033−8*0.0020907+0.0515372+0.0877941+0.0419993−0.4287712+0.3841923=0.7851294

Based on the relatively high conversion score, which is likely higher than any pre-established threshold for a marketing intervention, this particular user would not be presented with a marketing intervention 30. One would expect that this user would normally convert into an authenticated user. A marketing intervention 30 would thus not be needed.

Example 2

In this example, a conversion model 18 that is based on the same logistic regression model as used in Example 1 was used to generate a conversion score for a user that inputs the query "what is considered a tax deductible" into a search engine. A visitor ID is established (e.g., visitor_id=4728231848). Applying the SQL search query from above produces the following attributes:

query_attribute_length=35
query_category_turbo=0
query_category_turbotax=0
query_turbotax=0
channel_two=0
channel_three=1
name_first_page_one=0
(remaining attributes are zero)

Using these attributes, a conversion score is calculated as follows: Conversion Score #2=0.6651033−35*0.0020907−0.5180936=0.0738352

Based on the relatively low conversion score, which is lower than any pre-established threshold for a marketing intervention, this particular user would be presented with a marketing intervention 30. The presentation of the marketing intervention 30 to this user seeks to convert what would otherwise be a non-authenticating user to an authenticated user.

Figure 8:
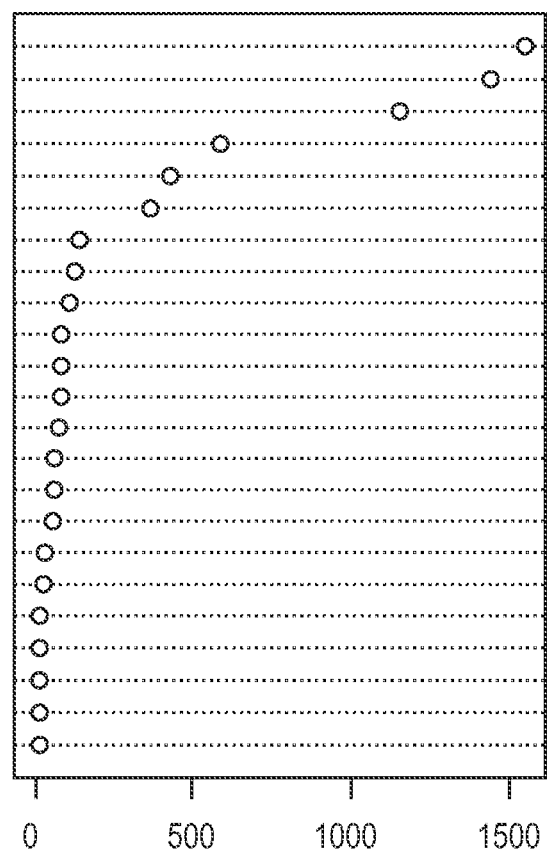
FIG. 8 illustrates the attributes used as part of a Random Forest model ranked in descending order of attribute importance.

As noted above, a Random Forest model may be used as an alternative. FIG. 8 illustrates the attributes for a Random Forest model. One can see that the most important model attributes for the Random Forest model are nearly the same as those for the logistic regression model.

Figure 9:
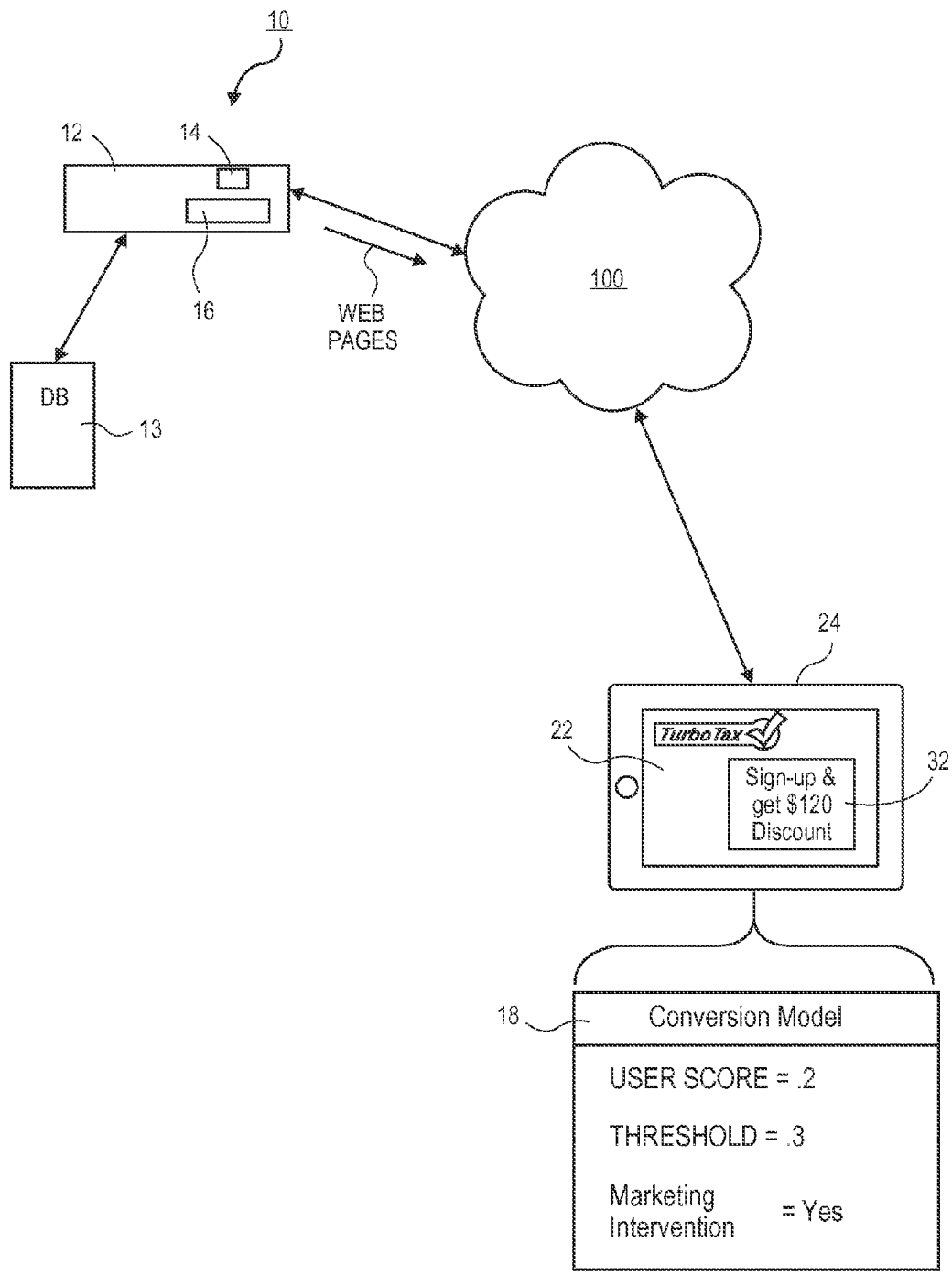
FIG. 9 illustrates a system for increasing the online conversion rate of potential users according to another embodiment.

FIG. 9 illustrates an alternative embodiment of the invention. In this embodiment, equivalent elements to those described with respect to FIG. 1 retain the same reference numbers for the sake of clarity. In particular, in this embodiment, a computing device 24 is used to access a computer-hosted service that is accessible via a browser 22. In one alternative aspect, the computer-hosted service may be accessible via an application or other program executed on the computing device 24. The computing device 24 connects via a network 100 such as the Internet to a computer 12 which may include one or more servers. The computer 12 may be linked to one or more databases 13 as described herein. The computer 12 may serve webpages or data that used as part of a local application running on the computing device 24. Unlike the embodiment of FIG. 1, the conversion model 18 is executed using the processing resources of the local computing device 24. For example, the conversion model 18 can obtain user-specific data and input the same into the conversion model 18 executed by the computing device 24. The computing device 24 can then generate a conversion score for the user based on the model. Depending on the generated conversion score (i.e., whether the generated conversion score falls below a pre-determined threshold), a marketing intervention 30 is displayed to the user of the computing device 24. In this particular example, the user may be presented with a discount offer 32 although other marketing interventions 30 are contemplated to fall within the scope of the invention.

The embodiment of FIG. 9 may have particular suitability to very quickly score a user because there is no lag in data transferring between a remote computer 12 (e.g., server) and a local computing device 24. For example, this embodiment may be implemented using JavaScript running on the local computing device 24.

Figure 10:
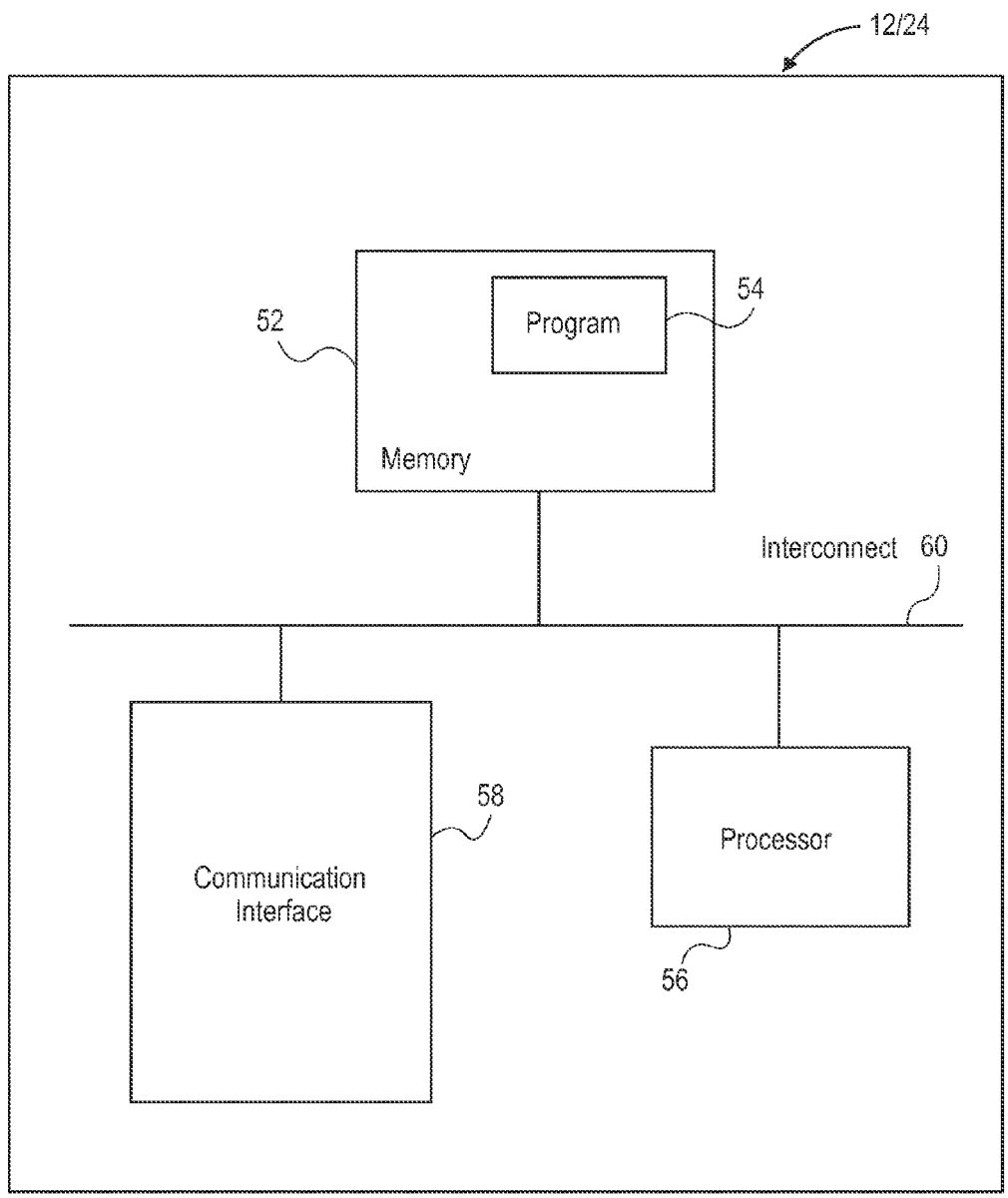
FIG. 10 illustrates components of a computing device such as computer or computing device that may be utilized to execute the software 16 or conversion model.

FIG. 10 generally illustrates components of a computing device such as computer 12 or computing device 24 that may be utilized to execute the software 16 or conversion model 18 and that includes a memory 52, program instructions 54, a processor or controller 56 to execute program instructions 54, a network or communications interface 58, e.g., for communications with a network or interconnect 60 between such components. The memory 52 may be or include one or more of cache, RAM, ROM, SRAM, DRAM, RDRAM, EEPROM and other types of volatile or non-volatile memory capable of storing data. The processor unit 56 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 60 may include a system bus, LDT, PCI, ISA, or other types of buses, and the communications or network interface may, for example, be an Ethernet interface, a Frame Relay interface, or other interface. The interface 58 may be configured to enable a system component to communicate with other system components across a network which may be a wireless or various other networks. It should be noted that one or more components of computing device may be located remotely and accessed via a network. Accordingly, the system configuration illustrated in FIG. 10 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 56 104 performs steps or executes program instructions 54 170 within memory 52 168 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented method of increasing an online conversion rate of potential users to a computer-hosted service comprising:
  generating, by a processor, a conversion model by:
    applying logistic regression to a data set of past users of the computer-hosted service that visited a webpage of the computer-hosted service,
    determining attributes corresponding to user-specific data that are statistically significant at predicting a conversion and associated attribute weightings,
    determining an intercept value, and
    encoding the conversion model having binary logic associated with the statistically significant attributes, the attribute weightings, and the intercept value, in JavaScript;
  retrieving, by a computing device of a potential user, the conversion model encoded in the JavaScript when the computing device communicates with the computer-hosted service;
  capturing, by the computing device of the potential user, user-specific data from a browser executing on the computing device of the potential user the user-specific data having attributes comprising:
    a query length integer value corresponding to a character length of a search engine query executed in a search engine used by the potential user, and
    a name of a first landing page for the potential user, the first landing page being a webpage the potential user first landed on and being determined based at least in part on a link the potential user clicked on in a previous location;
  inputting by the computing device of the potential user the captured user-specific data into the conversion model
  executing, by the computing device of the potential user, the received conversion model by at least:
    executing rules that assign a binary attribute value to each applicable attribute of the user-specific data other than the query length
    for each applicable attribute other than the query length, multiplying a respective binary attribute value with an associated attribute weighting,
    multiplying the query length integer value with an associated attribute weighting, and generating a conversion score for the potential user by summing the computed values resulting from each multiplication and the intercept value;

outputting, by the computing device of the potential user, the conversion score for the potential user;

determining, by the computing device of the potential user, that the conversion score is below a predetermined threshold value; and presenting, by the computing device of the potential user, an electronic communication to the potential user responsive to the determination that the conversion score is below the pre-determined threshold value.

2. The computer-implemented method of claim 1, wherein the computing device communicates with the computer-hosted service via a browser running on the computing device.

3. The computer-implemented method of claim 1, wherein the user-specific data comprises browser navigation data.

4. The computer-implemented method of claim 1, wherein the user-specific data comprises user behavioral data.

5. The computer-implemented method of claim 1, wherein the user-specific data comprises IP address data.

6. The computer-implemented method of claim 1, wherein the user-specific data comprises browser search data.

7. The computer-implemented method of claim 1, wherein the user-specific data comprises one or more of browser type data, operating system data, and computer hardware data.

8. The computer-implemented method of claim 1, wherein the user-specific data comprises cookie data.

9. The computer-implemented method of claim 1, wherein the electronic communication is executable by a browser of the computing device to open a chat dialog box presented through a display of the computing device.

10. The computer-implemented method of claim 1, wherein the electronic communication is executable by a browser of the computing device to present a modified web page through a display of the computing device.

11. The computer-implemented method of claim 1, wherein the electronic communication is executable by a browser of the computing device to present a visual discount indicia through a display of the computing device.

12. The computer-implemented method of claim 1, wherein the electronic communication is executable by a browser of the computing device to present a priority queuing offer through a display of the computing device.

13. The computer-implemented method of claim 1, wherein the electronic communication is executable by a browser of the computing device to redirect the potential user to a super-user session.

14. The computer-implemented method of claim 1, wherein the computer-hosted service comprises an on-line tax return preparation application.

15. The computer-implemented method of claim 1, wherein the computer-hosted service comprises an on-line question and answer service.

16. The computer-implemented method of claim 15, wherein the on-line question and answer service comprises an on-line tax question and answer service.

17. The computer-implemented method of claim 1, further comprising the computer-hosted service assigning an identification number to the potential user and storing the identification number in a database utilized by the computer-hosting service.

18. A system for increasing an online conversion rate of potential users to a computer-hosted service comprising:
a computing device of a potential user comprising;
a memory storing instructions,
a processor communicatively coupled to the memory, wherein the instructions, when executed by the processor, cause the processor to;
retrieve JavaScript encoding a conversion model through a network when the computing device communicates with the computer-hosted service, wherein the conversion model is generated by a processor external to the computing device of the potential user by:
applying logistic regression to a data set of past users of the computer-hosted service that visited a webpage of the computer-hosted service,
determining attributes corresponding to user-specific data that are statistically significant at predicting a conversion and associated attribute weightings,
determining an intercept value, and
encoding the conversion model having binary logic associated with the statistically significant attributes, the attribute weightings, and the intercept value, in the JavaScript;
capture user-specific data from a browser executing on the computing device of a potential user, the user-specific data having attributes comprising:
a query length corresponding to a character length of a search engine query executed in a search engine used by the potential user, and
a name of a first landing page for the potential user, the first landing page being a webpage the potential user first landed on determined based at least in part on a link the potential user clicked on in a previous location; and
input the captured user-specific data into the conversion model encoded in the JavaScript
execute the received conversion model by at least:
executing rules that assign a binary attribute value to each applicable attribute of the user-specific data other than the query length
for each applicable attribute other than the query length, multiplying a respective binary attribute value with an associated attribute weighting,
multiplying the query length integer value with an associated attribute weighting, and
generating a conversion score for the potential user by summing the computed values resulting from each multiplication and the intercept value;
output the conversion score for the potential user;
determine that the conversion score is below a predetermined threshold value,
send instructions to the browser executing on the computing device of the potential user responsive to the determination that the conversion score falls below a pre-determined threshold value, wherein the sent instructions are executable by the browser and initiate an electronic communication with the potential user.

19. The system of claim 18, wherein the user-specific data comprises browser navigation data.

20. The system of claim 18, wherein the sent instructions are executable by the browser to present a priority queuing offer through a display of the computing device.

21. The system of claim 18, wherein the sent instructions are variable based at least in part on the conversion score of the potential user.

22. The system of claim 18, wherein the computer-hosted service comprises an on-line tax return preparation application.

23. The system of claim 18, wherein the computer-hosted service comprises an on-line question and answer service.

24. The system of claim 23, wherein the on-line question and answer service comprises an on-line tax question and answer service.

25. The system of claim 18, wherein the processor external to the computing device of the potential user is part of the computer-hosted service.

\* \* \* \* \*